United States Patent [19]

Smith et al.

[11] 4,049,685
[45] Sept. 20, 1977

[54] PROCESS FOR CLEANSING SPENT CLAY

[75] Inventors: Gary W. Smith, Lynn Haven; Dwight E. Leavens, Panama City; Louis Ray Sims, Pensacola, all of Fla.

[73] Assignee: Sylvachem Corporation, Jacksonville, Fla.

[21] Appl. No.: 661,257

[22] Filed: Feb. 25, 1976

[51] Int. Cl.² ............................................. C11B 13/04
[52] U.S. Cl. ................................ 260/412.5; 252/412; 260/97.7; 260/407
[58] Field of Search .................... 260/412.5, 412, 420, 260/425, 428, 407, 97.7, 97.6, 97.5; 252/412, 413

[56] References Cited

U.S. PATENT DOCUMENTS

| | | | |
|---|---|---|---|
| 1,828,035 | 10/1931 | Ellis | 260/412.5 |
| 2,236,679 | 4/1941 | Ferguson et al. | 252/413 |
| 3,873,585 | 3/1975 | Sturwold et al. | 260/407 |

Primary Examiner—Winston A. Douglas
Assistant Examiner—P. E. Konopka
Attorney, Agent, or Firm—Richard H. Thomas

[57] ABSTRACT

Process for washing fatty acids from spent clay, such as spent bleaching clay, with aqueous alkali at elevated temperature is improved by establishing and maintaining the mixture of aqueous phase and fatty acid at a pH between about 5 and about 6.5.

6 Claims, 1 Drawing Figure

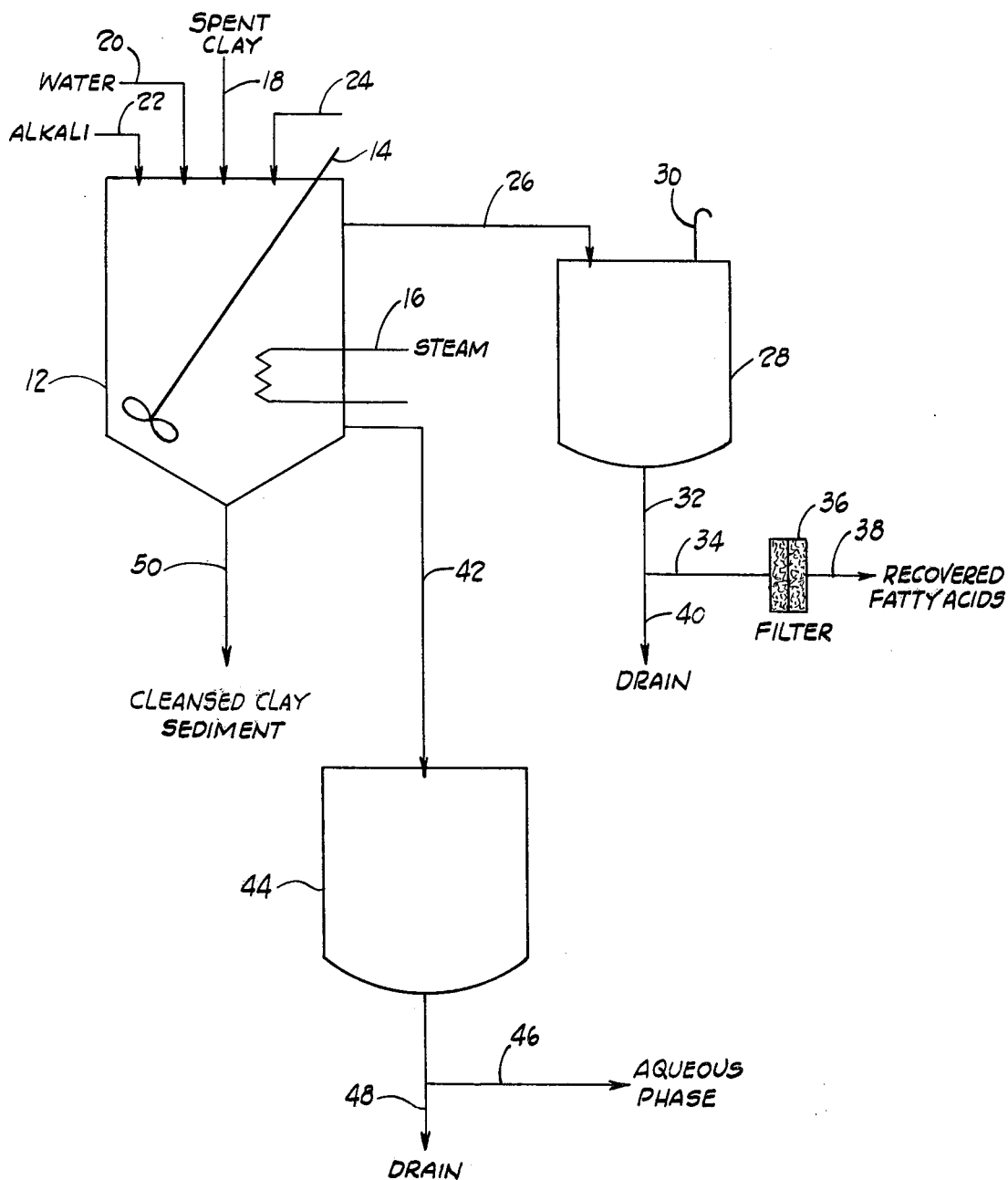

PROCESS FOR CLEANSING SPENT CLAY

This invention relates to an improvement in a process for cleansing fatty acids from spent clay, and more particularly to such process wherein the spent clay is washed with aqueous alkali at an elevated temperature.

BACKGROUND OF THE INVENTION

The bleaching of fatty acids often is done with clay such as an acid clay. The clay becomes spent, i.e., substantially incapable of further economic sorption of color bodies or of other economic use. (Such clay is also used as a catalyst to assist in polymerizing fatty acids to make "dimer" acids and higher polymers.)

Usually the spent clay is filtered off to yield a cake of about 25-65% clay solids laden with an oily residue of such acids. Disposal of such cake as landfill often conflicts with environmental considerations because of oil drainage and/or undesirable degradation of such residues. It represents also a waste of recoverable acids.

Heretofore, it has been proposed to wash spent clay catalyst vigorously with plain water in a prolonged operation for recovery of the clay (U.S. Pat. No. 3,873,585). Also, it has been proposed to wash spent bleaching clay from the bleaching of various oils, fats and waxes using sufficient aqueous soda ash or caustic soda solution to provide a fairly high pH (e.g., well above 7) in the aqueous phase of the clay washing operation for substantially neutralizing all fatty acids if any are present. Appreciable saponification of esters is experienced in some cases (U.S. Pat. Nos. 1,763,167; 1,078,435; 1,828,035; and 2,706,201). Collaterally the use of some alkali with crystalline clay catalyst in the preparation of polymeric fatty acids from unsaturated fatty acids has been proposed for reducing the ratio of trimer to dimer acids in the product (U.S. Pat. No. 2,955,121).

Advantages of the instant invention include reasonably rapid processing of the clay to obtain a high degree of fatty acid removal therefrom coupled with very modest use of alkali reagent, suppressing of excessive soap formation and attendant "tight" emulsion formation, and efficient recovery of fatty acid.

SUMMARY OF THE INVENTION

The subject improvement in a process for cleansing fatty acids from spent crystalline clay, wherein said spent clay is slurried and, in at least a primary wash stage, washed with aqueous alkali at elevated temperature for forming a cleansed clay sediment and recovering fatty acid, comprises: establishing and maintaining the mixture of aqueous phase and fatty acid in said primary wash stage at a pH between about 5 and about 6.5.

DETAILED DESCRIPTION

The drawing is a flow diagram which is the basis of design for a commercial unit treating about 1200 pounds per hour of spent clay (about 50% clay solids) at a Florida location. It will be described in detail in the example which follows. Instruments, pumps, valves and fittings are not shown, but are provided in conventional fashion as necessary or desirable.

As used in the specification, "fatty acids" are fluent in the manner of liquid at the instant washing conditions and are meant to include the following or fluent mixtures thereof: monomeric fatty acids such as tall oil fatty acids (mostly $C_{18}$, largely unsaturated) and $C_{12-26}$ fatty acids from other sources such as from vegetable oil refining; polymerized unsaturated fatty acids, i.e., so-called "dimer", "trimer" and higher polymeric acids which are the product of polymerizing mainly $C_{16-18}$ or even higher molecular weight unsaturated fatty acids according to a process similar to that referred to in U.S. Pat. No. 2,955,121; and "Distilled Tall Oil" (DTO), an intermediate cut from distillation of tall oil, said cut having more than about 10% and occasionally up to as much as about 50% resin acids.

The spent clays to be treated are crystalline, are often naturally or chemically treated to be acidic, including activated clays, montmorillonites, attapulgites, kaolinites, and the like.

The useful alkalies for this improvement include NaOH, KOH, $NH_4OH$, $Ca(OH)_2$, substances such as alkali metal and alkaline earth metal oxides yielding corresponding hydroxides in water, generally the alkali metal and ammonium hydroxides and carbonates such as soda ash and the slightly water soluble alkaline earth hydroxides, water soluble amines and especially cheap aqueous wastes that contain any of the foregoing, or mixtures of the same. Double decomposition of alkaline earth metal hydroxide, e.g. $Ca(OH)_2$, with sodium sulfate is an effective way of generating desired alkalinity here while also providing salt for separation of products while adding a little gypsum to the clay sediment.

The washing of the spent clay with the aqueous alkali can be done in a single wash stage or in a plurality of wash stages. Agitation, preferably mechanical agitation, is used, ordinarily moderate to vigorous. The temperature of washing should be at least about 40° C. and preferably 75°-95° C. at atmospheric pressure for efficiency, economy, and reasonable speed of processing. Where superatmospheric pressure washing is practiced, the temperature of the washing can go up correspondingly, e.g. to 200+°, so long as the washing mixture remains in liquid phase condition. An oily phase comprising fatty acids, less dense than water, can be collected conventionally from the aqueous phase.

The critical aspect of washing is control of the pH of the washing mixture in at least the primary wash stage between about 5 and about 6.5. Below about pH 5 the process is sluggish and of limited clay-cleansing value in a washing time of up to about two hours or more. Above about pH 6.5, significant saponification of the fatty acids can occur and "tighter" emulsions can form, making recovery of the fatty acids less effective and more difficult. Total time of washing in the wash stage or wash stages at preferred conditions is between about ½ and 1½ hours to attain about 10% or less fatty acid residue on the cleansed clay sediment. Where staged washing is used, the second or later stages should add alkali and increase the pH to about 7.5-11 to saponify some or all of the fatty acids present followed by acidulation with acid to a pH of about 5-6, to effect even better cleansing. This can lower the acid content to as low as about 1-4%.

The spent clay is dispersed in water with the alkali added before, during and/or after such dispersing to effect the primary wash stage. The water can contain a dissolved salt such as sodium sulfate or sodium chloride to assist oil separation if desired. As insoluble curds can sink with the clay sediment, this is no particular detriment to the process when such sediment is intended for landfill disposal. The weight ratio of water to spent clay in the primary wash stage is advantageously at least about 1:1 to obtain ready mixing, and not above about 10:1 to limit aqueous phase handling, although more water can be used if desired.

Cleansed clay preferably is separated from the aqueous phase by sedimentation, settling or other conventional ways. The less dense oily phase containing fatty acids ordinarily is collected as a layer supernatant on the aqueous phase, but centrifuging or other conventional methods can be used also for this separation.

In this specification all temperatures are in degrees Centigrade, all percentages are weight percentages, and all parts are parts by weight unless otherwise expressly indicated. The following example is the basis of design for the commercial plant referred to above.

Wash tank 12, equipped with agitator 14 and steam heating coil 16, is charged with: a filter cake sludge (line 18) of spent clay comprising about 700 pounds of tall oil fatty acids and about 800 pounds of bleaching clay*(Impact-150 Activated Clay, trademark Morton Chemical Co.); about 500 pounds of makeup water (line 20), and about 5 pounds of makeup 50% NaOH solution (line 22). Also introduced into tank 12 is 4505 pounds of recycled aqueous phase (in line 24 from a previous operation), said recycled aqueous phase containing about 5 pounds of NaOH and a trace of clay. If desired the recycled aqueous phase may be omitted and replaced by an equal weight of a mixture, said mixture containing about 4500 pounds of makeup water and about 10 pounds of 50% NaOH.

* Another suitable clay is "Filtral—Special Grade No. 4", trademark Filtrol Corporation.

The wash tank contents are heated to 85° C. and the sludge is thoroughly dispersed (slurried) with agitation. The makeup NaOH in line 22 referred to above is added in response to a pH controller, not shown, to establish and maintain pH of the aqueous phase in the wash tank at about 6.1 to 6.2. After about 45 minutes, agitation is suspended and supernatant oily phase collecting at the top of the aqueous phase for about 10 minutes is drawn off, by line 26, into storage tank 28, vented by line 30. The oily phase contains about 636 pouns of tall oil fatty acids, about 11 pounds of water, and about 4 pounds of clay. Periodically, this crude recovered material is drawn through lines 32 and 34 and pumped through filter 36 to yield recovered fatty acids 38. These have an acid number of about 180 and a Gardner color of about 19. From time to time settled water is withdrawn through drain 40.

The aqueous layer containing about 4505 pounds of water, about 5 pounds of NaOH and a trace of clay is drawn off of tank 12 by line 42 and pumped into storage tank 44. The aqueous mixture can either be recycled to tank 12 by line 46 for next washing or drained by line 48.

The cleansed clay sediment is then dumped from tank 12 by line 50 to a dumpster, not shown, for transfer to a landfill site. If the clay sediment in tank 12 is not mobile, the addition of more water by line 20 followed by agitation may be required to drain the clay. If desired, small amounts of NaOH and/or dispersing agents may be added to the clay sediment to improve mobility. The cleansed clay contains 8% fatty acids basis weight of clay. It can be washed additionally with fresh water or alkaline water.

The equipment is of steel, although austenitic stainless steel can be used to suppress darkening of the recovered oily phase containing fatty acids. If a great deal of chlorides are present, monel metal and/or corrosion resistant plastic equipment is preferred.

Frequently distilled tall oil ("DTO"), containing a substantial fraction of resin acids, is a minor part of the fatty acids in the filter cake sludge charge. The operation then is the same, and the results are substantially alike as far as cleansing the clay for disposal.

The process also can be made continuous or semicontinuous. Thus, the sludge water, and alkali can be slurried and fed as a stream through a tubular wash vessel for discharge into a first continuous centrifuge. Clay sediment then can be one product while the aqueous phase and oily phase containing fatty acids is directed to a second continuous centrifuge. The oily phase is collected as the other product from the second centrifuge while the de-oiled aqueous phase can be sent back to the washing operation and/or the slurrying operation.

In a preferred form of the invention, the pH in the primary wash stage for the mixture of aqueous phase and fatty acid is maintained in the range between about 6.0 and about 6.3. The separation is most efficient and takes place most rapidly employing the preferred pH range.

What is claimed is:

1. In a process fr cleansing fatty acids from spent crystalline clay wherein said spent clay is slurried and, in at least a primary wash stage, washed with aqueous alkali at elevated temperature for forming a cleansed clay sediment and recovering fatty acid, the improvement which comprises:
    establishing and maintaining the mixture of aqueous phase and fatty acid in said primary wash stage at a pH between about 5 and about 6.5.

2. The process of claim 1 wherein said clay is acidic, and said aqueous alkali is an alkali metal base, alkaline earth metal base, or ammonia.

3. The process of claim 1 wherein said fatty acid is fluent at the conditions of the primary wash stage and monomeric, polymeric, a distilled tall oil, or a mixture of two or more of these fatty acids.

4. The process of claim 1 wherein the weight ratio of aqueous alkali to spent clay in said primary wash stage is between about 1:1 and about 10:1.

5. The process of claim 1 wherein said aqueous alkali is a water and caustic soda solution, and the temperature in said primary wash stage is between about 40° and about 95° C.

6. The process of claim 1 wherein the mixture of aqueous phase and fatty acid in said primary wash stage is maintained at a pH between about 6.0 and about 6.3.

* * * * *

UNITED STATES PATENT AND TRADEMARK OFFICE
CERTIFICATE OF CORRECTION

PATENT NO. : 4,049,685

DATED : September 20, 1977

INVENTOR(S) : Gary W. Smith, Dwight E. Leavens and Louis Ray Sims

It is certified that error appears in the above-identified patent and that said Letters Patent are hereby corrected as shown below:

Col. 3, line 29, change "Filtral" to --Filtrol--; line 40, change "pouns" to --pounds--. Col. 4, line 33, in claim 1, change "fr" to --for--.

Signed and Sealed this

Twenty-seventh Day of December 1977

[SEAL]

Attest:

RUTH C. MASON  
Attesting Officer

LUTRELLE F. PARKER  
Acting Commissioner of Patents and Trademarks